No. 829,860. PATENTED AUG. 28, 1906.
F. EICHBERG.
MEANS FOR CONTROLLING ALTERNATING CURRENT MOTORS.
APPLICATION FILED JAN. 11, 1905.
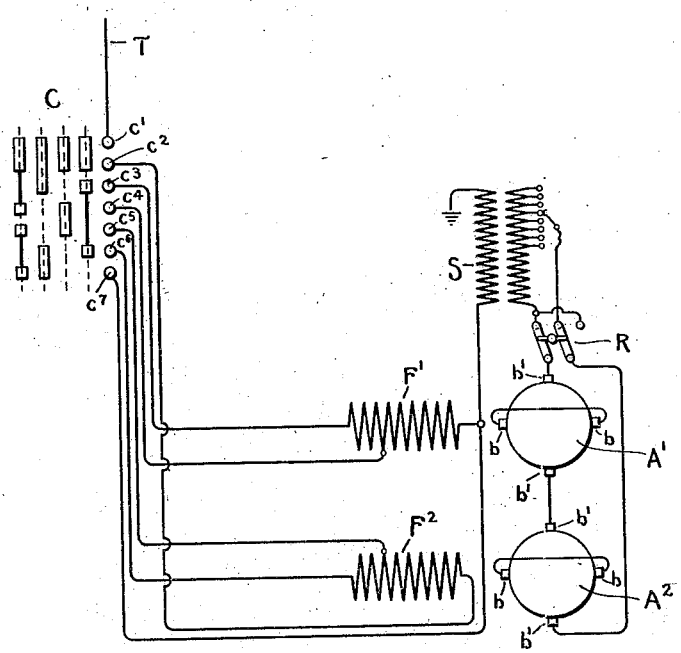
Witnesses.
J. Ellis Glen.
Helen Orford.
Inventor.
Friedrich Eichberg.
by Albert G. Davis
Atty.

UNITED STATES PATENT OFFICE.

FRIEDRICH EICHBERG, OF BERLIN, GERMANY, ASSIGNOR TO GENERAL ELECTRIC COMPANY, A CORPORATION OF NEW YORK.

MEANS FOR CONTROLLING ALTERNATING-CURRENT MOTORS.

No. 829,860.  Specification of Letters Patent.  Patented Aug. 28, 1906.

Application filed January 11, 1905. Serial No. 240,552.

*To all whom it may concern:*

Be it known that I, FRIEDRICH EICHBERG, a subject of the Emperor of Austria-Hungary, residing at Berlin, in the Empire of Germany, have invented certain new and useful Improvements in Means for Controlling Alternating-Current Motors, of which the following is a specification.

My invention relates to the control of vehicles propelled by alternating-current motors of the commutator type in which current is supplied to the field-winding while the armature is maintained in a locally-closed circuit in which current is induced by current in the field-circuit.

My invention is thus applicable to the control of motors of the type disclosed in an application, Serial No. 146,692, filed by Gabriel Winter and myself March 7, 1903. In this former application a type of motor is disclosed in which the armature of the motor is provided with two sets of commutator-brushes. One set is connected to short-circuit the armature on the line of field magnetization, so that the armature-winding acts as a short-circuited secondary for the field-winding, thereby increasing the power factor and efficiency of the motor, while the second set, displaced substantially ninety electrical degrees from the first set, is supplied from the secondary of a transformer, the primary of which is in series with the field, with current which produces a magnetization of the armature at an angle to that produced by the currents in the field-winding and the short-circuiting armature connection and which with these currents produces the motor torque.

My present invention consists in a simple and efficient means for the control of a plurality of such motors, comprising a control-switch adapted to connect the field-windings of the motors in series and in parallel. The control-switch may further be arranged to vary the number of field turns of the motor. Since the armature connections are not changed, the controlling-switch is exceedingly simple and since no resistance is employed an efficient operation is secured.

My invention will be best understood by reference to the accompanying drawing, which shows diagrammatically two motors provided with a controlling-switch arranged in accordance with the invention.

In the drawing, F′ represents the field-winding of one of the motors, and A′ the armature. The armature A′ is provided with one set of brushes $b\ b$, short-circuiting the armature on the line of magnetization of the field-winding. The second set of brushes $b'\ b'$ is supplied with current from the secondary of the transformer S, the primary of which is in series with the field-windings. The second motor is similarly arranged, its corresponding brushes $b'\ b'$ being connected in series with those of the first motor. A reversing-switch R is provided for varying the relative connections of the two armatures to the series transformer, and thereby reversing the direction of torque of the motors.

C represents the controlling-switch by means of which the field connections are varied.

The controlling-switch C is shown with its contacts developed on a plane surface and in off position. When the controlling-switch is moved to its first operative position, as indicated by the first dotted line, a circuit is closed from the trolley T or other collecting device, to contact $c'$, to contact $c^2$, to the motor-field $F^2$, contact $c^6$, contact $c^3$, motor-field $F'$, primary of series transformer S, to ground. The two fields are thus connected in series with all the field-windings in circuit. When the controlling-switch C is moved to its second position, the circuit is closed, as follows: from trolley T, contact $c'$, contact $c^2$, through a portion of field $F^2$, contact $c^5$, contact $c^4$, a portion of field $F'$, to series transformer S, and portions of both fields are thus cut out of circuit and the speed of the motors is increased. When the controller C is moved to its third position, the two fields are connected in parallel with all the field-windings in circuit, as will be seen by tracing out the circuits, and in the fourth position of the controlling-switch the number of field turns is again reduced. Four speeds are thus obtained with a simple arrangement of the controlling-switch and without the employment of resistances. I have shown the series transformer S arranged with a variable ratio of transformation, so that a further control of the motor speed and torque may be obtained, if desired.

While for the sake of simplicity I have shown the motors diagrammatically, it will be understood that any well-known form of winding may be employed. In practice the field-winding would consist of a distributed winding contained in slots on the inner periphery of a laminated field structure, while the armature would be provided with a winding similar to that in a direct-current machine.

I have shown the motors in the drawings provided with two independent sets of brushes; but I wish it to be understood that this particular arrangement of brushes and connections is not essential, it being necessary only that the brushes and their connections should be arranged both to short-circuit the armature on the line of field magnetization and to supply current to the armature on a line displaced substantially ninety degrees from the field magnetization.

Changes may be made in the arrangement of the control-switch and the circuit connections, and accordingly I do not desire to limit myself to the particular construction and arrangement of parts here shown, but aim in the appended claims to cover all modifications which are within the scope of my invention.

What I claim as new, and desire to secure by Letters Patent of the United States, is—

1. In combination with a plurality of alternating-current motors of the commutator type having their armatures connected in a locally-closed circuit, means for varying the relative connections of the motor-fields to the source of current and for varying the number of effective field turns.

2. In combination with a plurality of alternating-current motors of the commutator type having their armatures connected in a locally-closed circuit, a switch adapted to connect the motor-fields in series and in parallel to the source and to vary the number of effective field turns.

3. In combination with a plurality of alternating-current motors of the commutator type each having commutator-brushes and connections arranged both for short-circuiting the armature on the line of field magnetization and for supplying current to the armature on a line displaced substantially ninety electrical degrees therefrom, a transformer having its secondary in closed circuit with the armature-supply connections and its primary in series with the motor-fields, and a switch adapted to connect the motor-fields in series and in parallel to the source of current.

4. In combination with a plurality of alternating-current motors of the commutator type each having commutator-brushes and connections arranged both for short-circuiting the armature on the line of field magnetization and for supplying current to the armature on a line displaced substantially ninety electrical degrees therefrom, a transformer having its secondary in closed circuit with the armature-supply connections and its primary in series with the motor-fields, and a switch adapted to vary the number of effective turns in said motor-fields.

5. In combination with a plurality of alternating-current motors of the commutator type each having brushes and connections arranged both for short-circuiting the armature on the line of field magnetization and for supplying current to the armature on a line displaced substantially ninety electrical degrees therefrom a transformer having its secondary included in closed circuit with the armature-supply connections and its primary in series with the motor-fields, and a switch adapted to connect the motor-fields in series and in parallel to the source and to vary the number of effective field turns.

6. In combination with a plurality of alternating-current motors of the commutator type each having brushes and connections arranged both for short-circuiting the armature on the line of field magnetization and for supplying current to the armature on a line displaced substantially ninety electrical degrees therefrom, a transformer having its secondary included in closed circuit with the armature-supply connections and its primary in series with the motor-fields, a switch adapted to connect the motor-fields in series and in parallel to the source and to vary the number of effective field turns, and a switch adapted to reverse the relative connections of the secondary of said transformer to the armature-brushes.

7. In combination with a plurality of alternating-current motors of the commutator type each having brushes and connections arranged both for short-circuiting the armature on the line of field magnetization and for supplying current to the armature on a line displaced substantially ninety electrical degrees therefrom, a transformer having its secondary included in closed circuit with the armature-supply connections and its primary in series with the motor-fields, a switch adapted to connect the motor-fields in series and in parallel to the source and to vary the number of effective turns, and means for varying the ratio of transformation of said transformer.

In witness whereof I have hereunto set my hand this 21st day of December, 1904.

FRIEDRICH EICHBERG.

Witnesses:
 HENRY HASPER,
 WOLDEMAR HAUPT.